(12) United States Patent  
Joguet et al.

(10) Patent No.: US 8,659,545 B2
(45) Date of Patent: Feb. 25, 2014

(54) DEVICE AND METHOD FOR CONTROLLING COMPUTERIZED EQUIPMENT

(75) Inventors: Pascal Joguet, Bordeaux (FR);  
Guillaume Largillier, Bordeaux (FR)

(73) Assignee: Stantum, Bordeaux (FR)

( * ) Notice: Subject to any disclaimer, the term of this patent is extended or adjusted under 35 U.S.C. 154(b) by 61 days.

(21) Appl. No.: 13/013,994

(22) Filed: Jan. 26, 2011

(65) Prior Publication Data

US 2011/0119580 A1    May 19, 2011

Related U.S. Application Data

(62) Division of application No. 10/590,306, filed as application No. PCT/FR2005/000428 on Feb. 23, 2005, now Pat. No. 8,049,730.

(30) Foreign Application Priority Data

Feb. 23, 2004    (FR) .................................... 04/50329

(51) Int. Cl.  
*G09G 5/00* (2006.01)

(52) U.S. Cl.  
USPC ........ 345/156; 345/157; 345/173; 178/18.01; 178/18.06

(58) Field of Classification Search  
USPC ............. 345/156–173, 179; 178/18.01–18.09  
See application file for complete search history.

(56) References Cited

U.S. PATENT DOCUMENTS

| | | | |
|---|---|---|---|
| 4,914,624 A * | 4/1990 | Dunthorn | 345/173 |
| 5,027,689 A | 7/1991 | Fujimori | |
| 5,053,585 A | 10/1991 | Yaniger | |
| 5,153,829 A * | 10/1992 | Furuya et al. | 84/622 |
| 5,327,163 A | 7/1994 | Hashimoto et al. | |
| 5,559,301 A | 9/1996 | Bryan, Jr. et al. | |
| 5,825,352 A * | 10/1998 | Bisset et al. | 345/173 |
| 5,869,791 A | 2/1999 | Young | |
| 6,073,036 A | 6/2000 | Heikkinen et al. | |
| 6,107,997 A | 8/2000 | Ure | |

(Continued)

FOREIGN PATENT DOCUMENTS

| | | |
|---|---|---|
| DE | 100 42 300 A1 | 3/2002 |
| WO | WO 01/69399 A2 | 9/2001 |
| WO | WO 03/041006 A1 | 5/2003 |

OTHER PUBLICATIONS

U.S. Appl. No. 13/187,143, filed Jul. 20, 2011, Joguet, et al.

(Continued)

*Primary Examiner* — Jennifer Nguyen

(74) *Attorney, Agent, or Firm* — Oblon, Spivak, McClelland, Maier & Neustadt, L.L.P.

(57) ABSTRACT

A method of controlling a computerized device with a tactile multi-point matrix sensor placed on a display device, the method including the steps of simultaneously acquiring data of a first contact position and a second contact position of a first and a second finger that is placed on the multi-point tactile matrix sensor, respectively; creating a first cursor and a second cursor that are associated with the first and second finger, respectively; displaying a graphical object on the display device; associating the first cursor and the second cursor with the graphical object to interact with the graphical object; and generating control messages for the computerized device based on positional data of the first cursor, the second cursor, and the graphical object.

16 Claims, 21 Drawing Sheets

INTERACTION WITH GRAPHICAL OBJECTS

(56) References Cited

U.S. PATENT DOCUMENTS

| | | | |
|---|---|---|---|
| 6,229,529 B1 | | 5/2001 | Yano et al. |
| 6,281,420 B1 | * | 8/2001 | Suzuki et al. ............ 84/477 R |
| 6,323,846 B1 | | 11/2001 | Westerman et al. |
| 6,570,078 B2 | | 5/2003 | Ludwig |
| 6,762,752 B2 | | 7/2004 | Perski et al. |
| 6,888,536 B2 | | 5/2005 | Westerman et al. |
| 7,015,894 B2 | | 3/2006 | Morohoshi |
| 7,046,235 B2 | | 5/2006 | Katoh |
| 7,307,623 B2 | * | 12/2007 | Enomoto ................. 345/173 |
| 2002/0005108 A1 | | 1/2002 | Ludwig |
| 2003/0071858 A1 | * | 4/2003 | Morohoshi ............... 345/856 |
| 2003/0197687 A1 | * | 10/2003 | Shetter ..................... 345/173 |
| 2006/0026521 A1 | | 2/2006 | Hotelling et al. |
| 2006/0097991 A1 | | 5/2006 | Hotelling et al. |
| 2006/0238518 A1 | | 10/2006 | Westerman et al. |
| 2007/0198926 A1 | | 8/2007 | Joguet et al. |

OTHER PUBLICATIONS

U.S. Appl. No. 13/013,970, filed Jan. 26, 2011, Joguet, et al.
U.S. Appl. No. 13/013,976, filed Jan. 26, 2011, Joguet, et al.
U.S. Appl. No. 13/013,985, filed Jan. 26, 2011, Joguet, et al.
Andrew Sears, et al., "A new era for touchscreen applications: High precision, dragging icons, and refined feedback", Human-Computer Interaction Laboratory Department of Computer Science, CAR-TR-506, CS-TR-2487, vol. 3, Jun. 1990, 1 front page, pages 1-38.
Jun Rekimoto, SmartSkin: An Infrastructure for Freehand Manipulation on Interactive Surfaces, Interaction Laboratory Sony Computer Science Laboratories, Inc., Apr. 20-25, 2002, 10 pages.

* cited by examiner

DEVICE AND METHOD FOR CONTROLLING COMPUTERIZED EQUIPMENT

RELATED APPLICATION

Is a divisional of U.S. patent application Ser. No. 10/590,306 filed Nov. 6, 2006 now U.S. Pat. No. 8,049,730, the entire contents being incorporated herein by reference. This application is being filed concurrently with the following present applications: U.S. patent application Ser. No. 13/013,970; U.S. patent application Ser. No. 13/013,976; and U.S. patent application Ser. No. 13/013,985, all are filed on even date herewith. U.S. patent application No. 10/590,306 is also a §371 of International Application No. PCT/FR2005/000428, with an international filing date of Feb. 23, 2005 (WO 2005/091104 A2, published Sep. 29, 2005), which is based on French Patent Application No. 04/50329, filed Feb. 23, 2004, the entire contents being incorporated herein by reference.

TECHNICAL FIELD

The invention relates to an interface permitting, e.g., the control of music software or of a controller by a multi-contact tactile screen with the manipulation of virtual objects.

BACKGROUND

Manual-type software controllers are known. They include, e.g., potentiometers that can be manipulated by the user in the form of a console and control the different functions of music software. Such a console is disclosed in WO 01/69399.

One disadvantage of this type of controller is that they are not very ergonomic for an efficient manipulation of software. One thought has been to implement a tactile screen for the manipulation of and the access to software functions.

In the area of tactile controllers, WO 03/041006 and U.S. Pat. No. 6,570,078 disclose musical controllers with tactile control on a matrix sensor. The technologies described therein permit tactile control of the multi-contact type in which all the fingers can intervene for the control of software.

However, those publications do not contemplate a visual return of the manipulations since the different matrix sensors are of the opaque type.

US 2002/005108 discloses a system and a process for controlling in real time signal processors, synthesizers, musical instruments, MIDI processors, lights, video, and special effects during presentations, recordings or in compositional environments using images derived from tactile sensors, from matrices of pressure sensors, from matrices of optical transducers, from matrices of chemical sensors, matrices of body sensors and from digital processes. That system furnishes touchpads, matrices of pressure sensors and matrices of body sensors as interfaces of tactile control, video cameras and matrices of light sensors such as optical transducers, matrices of chemical sensors and of other apparatuses for generating digital images from processes on computers or from digital simulations. The tactile transducers can be arranged on the keys of conventional instruments, attached to existing instruments or also be used to create new instruments or new controllers. The matrices of chemical sensors and the other apparatuses for generating digital images from computer processes or from digital simulations can be used to observe or simulate natural physical phenomena such as environmental conditions or self-organizing process behaviors. Scalar matrices or vectors are processed to extract pattern limits, geometric properties of pixels within limits (geometric center, weighted moments, etc.) and information derived from a higher level (direction of rotation, segmented regions, pattern classification, syntax, grammars, sequences, etc.) that are used to create control signals to external video and visual equipment and for control or even algorithms. It also provides MIDI and non-MIDI control signals.

It does not contemplate a visual return of manipulations and does not mention a command law. Finally, it does not contemplate technical solution to the masking phenomena that intervene when several figures are aligned or placed in an orthogonal manner on the sensor. The resolution of these problems is indispensable for realizing a multi-contact tactile sensor.

U.S. Pat. No. 5,027,689 discloses an apparatus for generating musical sounds. That apparatus comprises a device for generating positional information for generating information about the position of musical instruments (PS) as values of plane coordinates. This information (PS) is stored in a memory device or determined in a selective manner by a manual operation. The apparatus also comprises a device for the conversion of information for converting the information (PS) into information for controlling parameters of musical sounds (PD). This PD control information controls the source signals of musical sounds (S11, S12 and S13) for generating a sound field corresponding to the position of musical instruments arranged on a stage. This allows an operator to verify the positions of musical instruments on a stage, thus supplying the sensation of being in a true live performance.

It mentions a multi-contact, but it is only two contacts on an axis and not in Cartesian coordinates. The apparatus only functions linearly for the multipoint option and does not allow tracking (following of trajectory). Moreover, the apparatus requires a plurality of sensors specific to each of the instruments.

U.S. Pat. No. 5,559,301 discloses a solution of the musical controller type in the form of a tactile screen with visual return of the manipulated objects. However, it describes predefined objects (essentially of the sliders type and circular potentiometer type). These object types are limiting and can prove to be not very ergonomic for special manipulations. Moreover, the acquisition mode described is not in real time. In fact, an icon must first be activated by a first contact with a finger, then the manipulated object, and the values are only updated after the icon has been released. That system does not allow management in real time of the parameters associated with the object. Finally, the tactile sensor is a "mono-contact" sensor that permits the acquisition, e.g., only for a single finger and therefore the control of a single object at a time. This characteristic is very limiting for an efficient manipulation of objects.

SUMMARY

This invention relates to a process for controlling computerized equipment with a device including a multi-contact bidimensional sensor that acquires tactile information and a calculator that generates command signals as a function of the tactile information, including generating graphical objects on a screen placed under a transparent multi-contact tactile sensor, each graphical object associated with at least one specific processing rule such that the sensor delivers during each acquisition phase a plurality of tactile information, and each piece of the tactile information forms an object of a specific processing determined by its localization relative to a position of one of the graphical objects.

This invention also relates to a device for controlling computerized equipment including a multi-contact bidimensional sensor for acquisition of tactile information, a viewing screen arranged under the bidimensional tactile sensor, a memory for recording graphical objects that are each associated with at least one processing rule, and a local calculator that analyzes positions of acquired tactile information and applies a processing rule as a function of the position relative to the position of the graphical objects.

BRIEF DESCRIPTION OF THE DRAWINGS

The disclosure will be better understood with the aid of the following description given below solely by way of explanation of a selected, representative example with reference made to the attached figures in which.

DETAILED DESCRIPTION

The term "multi-contact" defines a tactile sensor that allows acquisition of contact zones of several fingers at a time in contrast to "mono-contact" sensors that only allow acquisition for a single finger or for a stylus as, e.g., in U.S. Pat. No. 5,559,301.

We provide a screen for multi-contact tactile musical control with visual return of the different actions of the user on parameterable objects.

We also provide a process for controlling computerized equipment with a device comprising a multi-contact bidimensional sensor for the acquisition of tactile information as well as calculating means generating command signals as a function of this tactile information, and a stage for generating graphical objects on a screen placed under a transparent multi-contact tactile sensor, each of which graphical objects is associated with at least one specific processing law, wherein the sensor delivers during each acquisition phase a plurality of tactile information, and each piece of the tactile information forms the object of a specific processing determined by its localization relative to the position of one of these graphical objects.

The process steps may comprise a bounding zone detection of the contact zone of an object with the tactile sensor.

The process may also comprise a barycenter detection.

It may further comprise stages for refreshing graphical objects as a function of the process carried out during at least one previous acquisition stage.

The process may comprise a stage for editing graphical objects including generating a graphical representation from a library of graphical components and functions and determining an associated processing law.

The acquisition frequency of the tactile information may be greater than 50 Hz.

We also provide a device for controlling a computerized piece of equipment comprising a multi-contact bidimensional sensor for acquiring tactile information, a viewing screen arranged under the bidimensional tactile sensor, a memory for recording graphical objects that are each associated with at least one processing law, and a local calculator for analyzing the position of acquired tactile information and application of a processing law as a function of the position relative to the position of the graphical objects.

The device may be connected to a hub (multi-socket network) to form a network of controllers.

This multi-contact bidimensional tactile sensor is advantageously a resistive tile.

Furthermore, the device may comprise a network output suitable for receiving a network cable.

In the following description, the control is performed on a computerized piece of equipment that can be, e.g., a music software, a controller, audiovisual equipment or multimedia equipment.

Figure 1A:
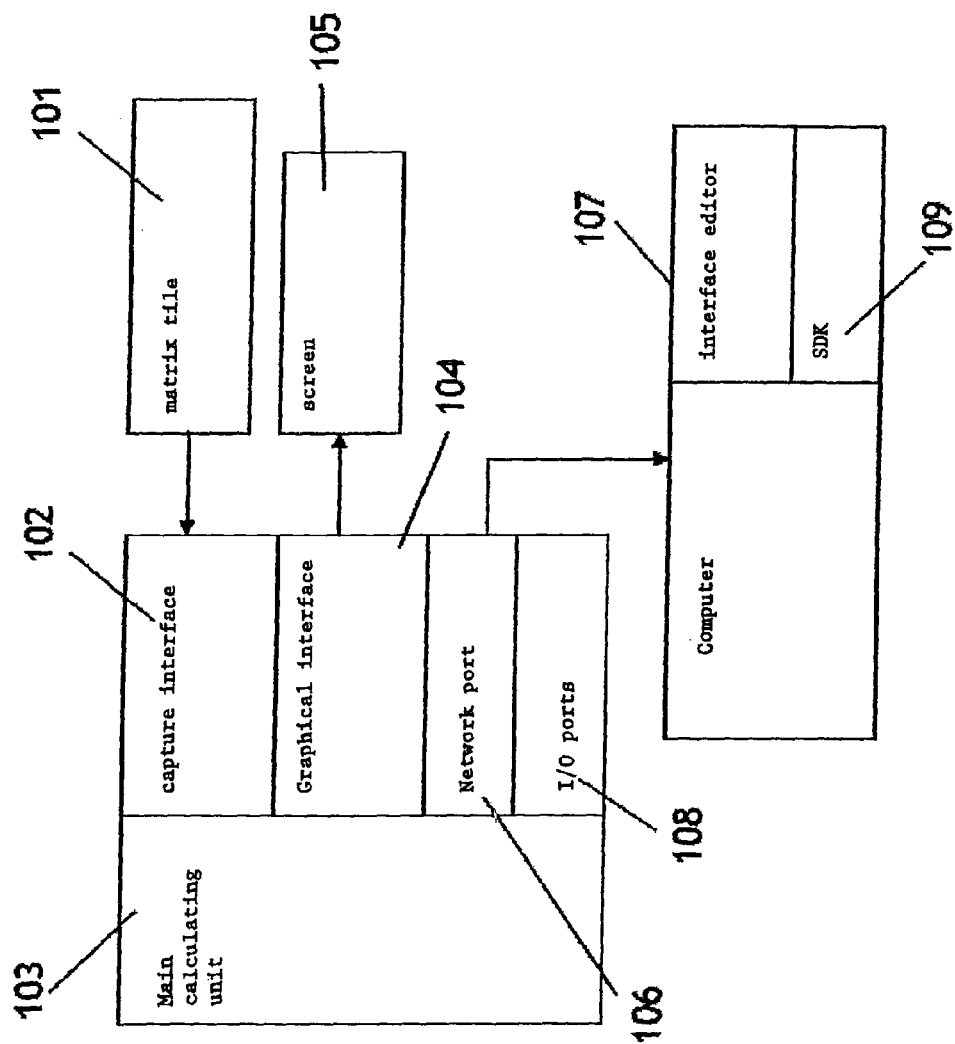
FIG. 1A is a functional diagram of a controller.
Figure 1B:
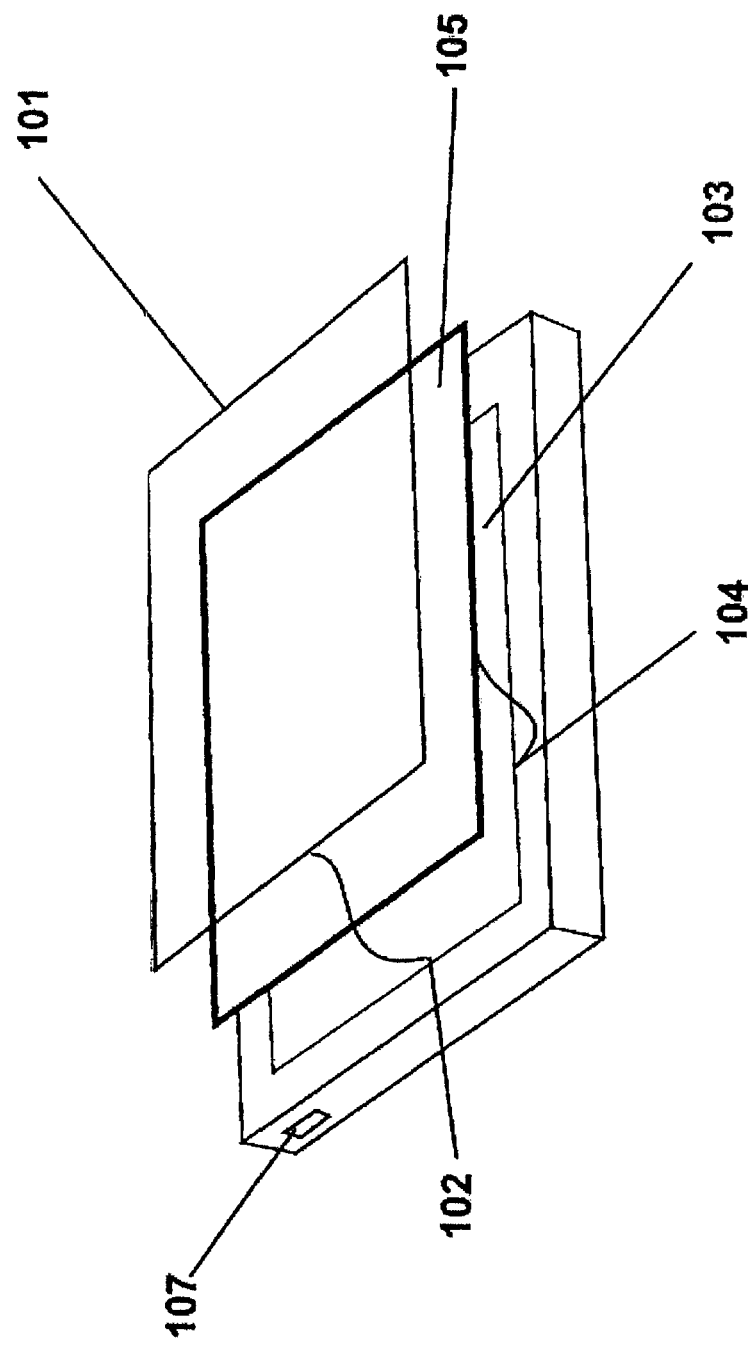
FIG. 1B represents the structure of the controller associated with the functional diagram.
Figure 2A:
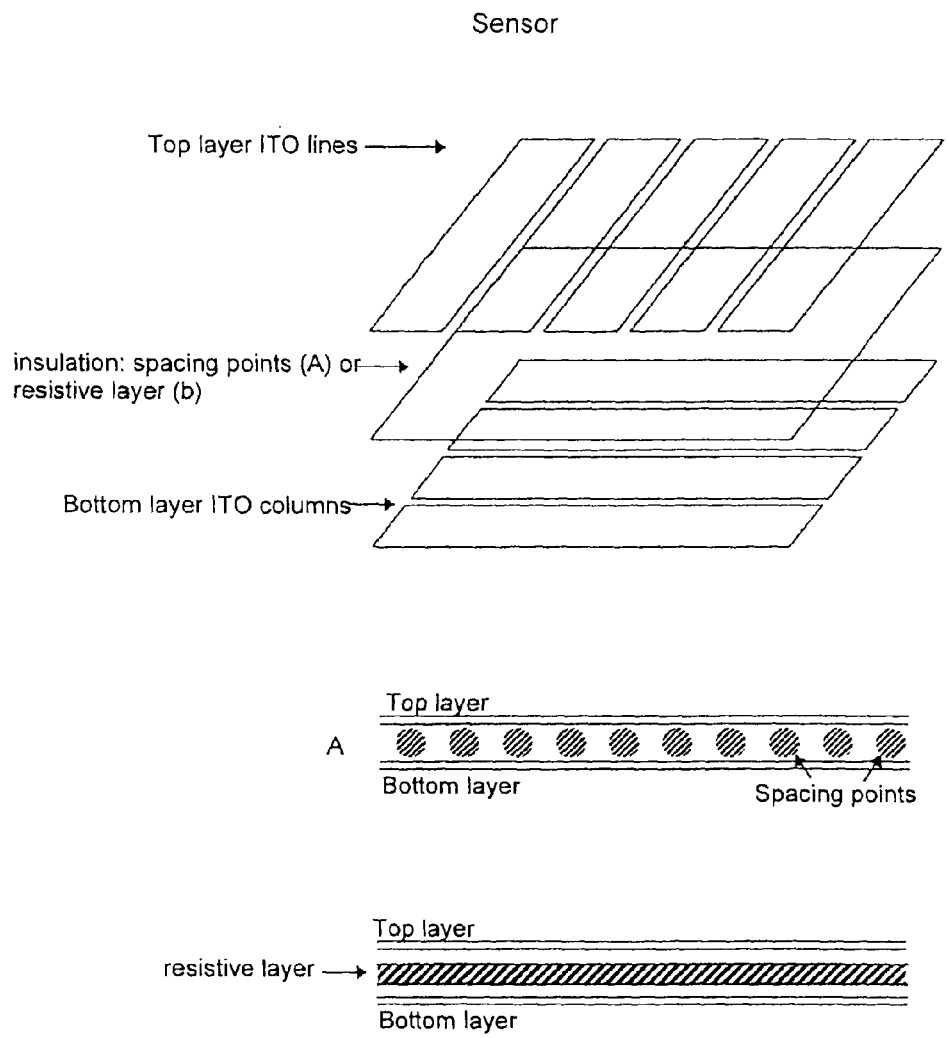
FIG. 2A is a description of the tactile matrix sensor.

As FIGS. 1A, 1B and 2A illustrate, the first basic element is the matrix sensor 101 necessary for acquisition (multi-contact manipulations) with the aid of a capture interface 102. The sensor 101 may be divided, if necessary, into several parts to accelerate capture, with each part being scanned simultaneously.

The general principle is to create as many cursors (such as a mouse cursor) as there are zones detected on the sensor and to follow their developments in time.

When the user removes the user's fingers from the sensor, the associated cursors are destroyed.

In this manner, the position and development of several fingers are captured simultaneously on the sensor. This is a multi-contact capture that is quite innovative for this type of controller.

The sensor may be a resistive tactile matrix tile of a known type.

Resistive tactile matrix tiles are composed of 2 superposed faces on which tracks of ITO (indium tin oxide), that is a translucent conductive material, are organized. The tracks are laid out in lines on the upper layer and in columns on the lower layer and a matrix as shown in FIG. 2A.

Figure 2B:
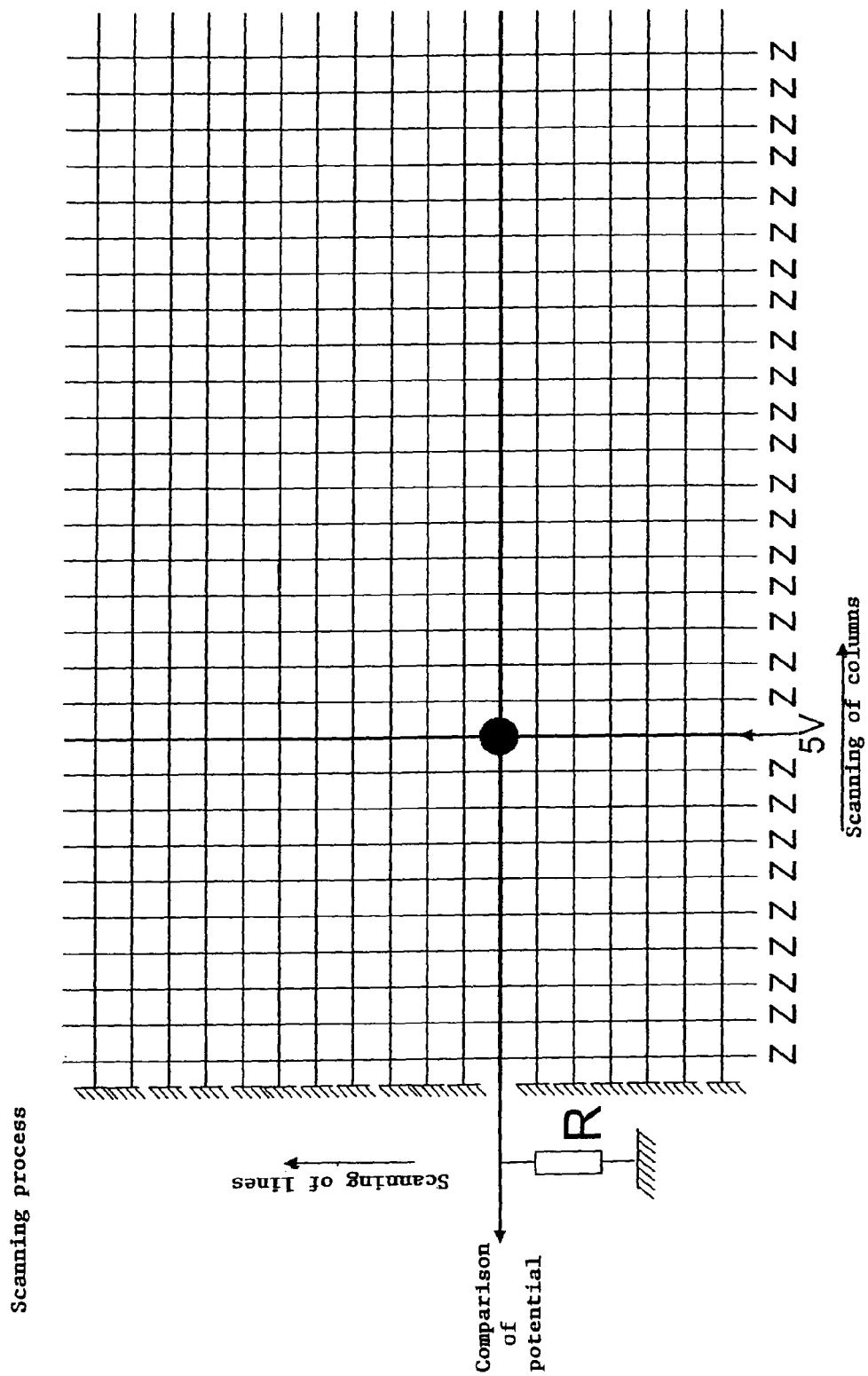
FIG. 2B describes the first stage of the scanning functioning of the sensor in order to obtain the multi-contact information.

The two conductive layers are insulated from one another by spacing braces. The intersection of the line with the column forms a contact point. When a finger is placed on the tile, a column or columns situated on the upper layer are put in contact with a line or line situated on the lower layer, thus creating one or several contact points as shown in FIG. 2B.

It is possible to replace the braces by a transparent resistive material (e.g., a conductive polymer) whose resistance varies as a function of the pressure, which resistance drops if a sufficient pressure force is exerted. In this manner, it is also possible to extract the pressure exerted on the surface by performing a resistance measurement at each line-column intersection.

As concerns the musical or audiovisual use of these tiles, it is imperative to measure the activity of a finger with a maximum latency of 20 ms.

The state of the tile is measured at least 100 times per second, which tile can be divided into several zones to perform a parallel processing on these zones.

Thus, the sampling frequency of the tile may be at least 100 Hz.

Another basic element is the electronic device for scanning the tactile tile that allows the simultaneous detection of several contact points on the matrix sensor. In fact, the known methods of acquisitions for this type of sensor do not allow the detection of several simultaneous contact points.

Figure 2C:
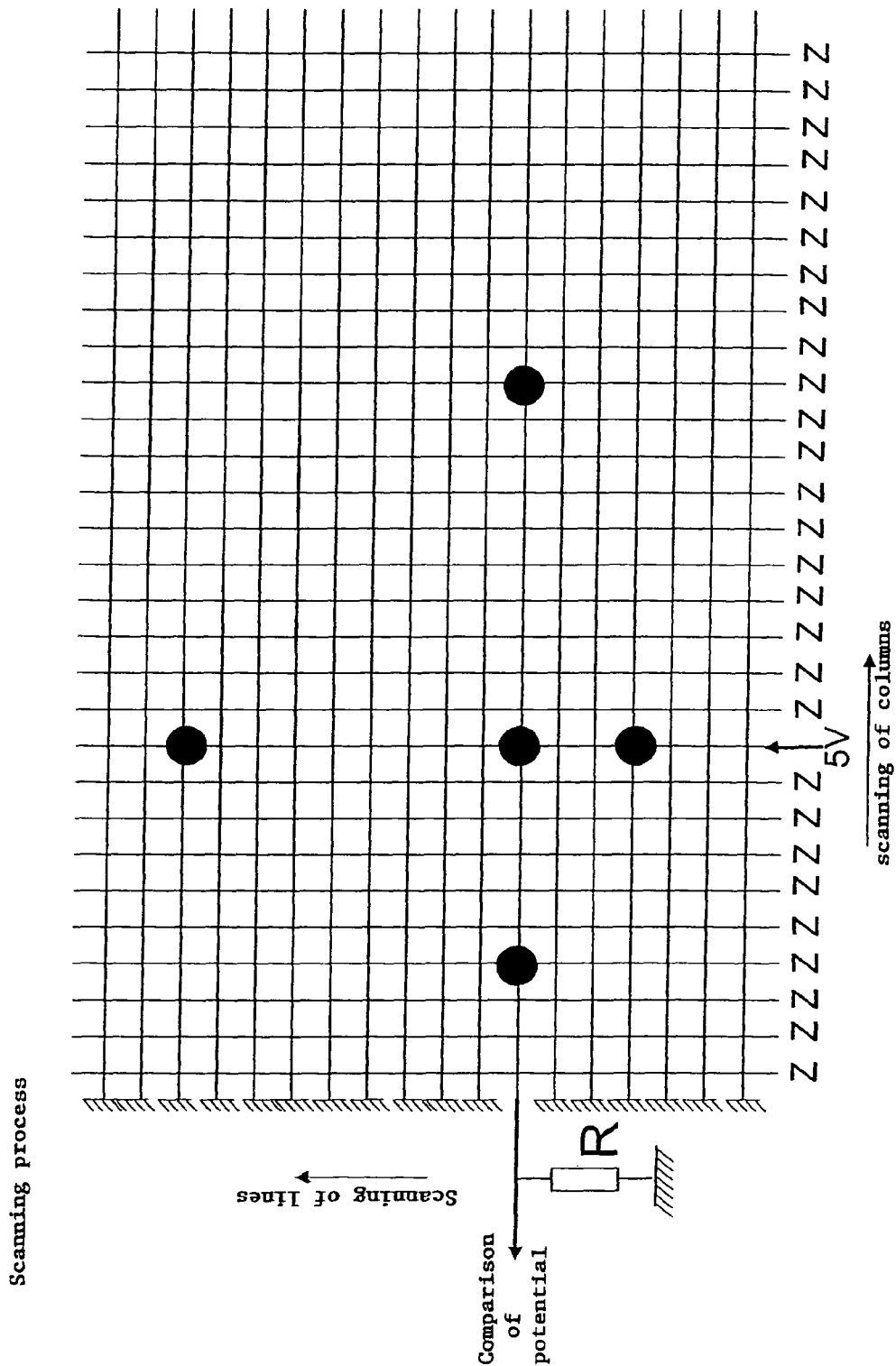
FIGS. 2C, 2E and 2F explain the resolution of problems of orthogonality.

The known methods do not allow the problems illustrated in FIG. 2C to be solved.

If a simultaneous measurement of all the lines is performed while feeding a column, problems of orthogonality arise. Contact point No. 1 will mask contact point No. 2. Likewise, if a line is measured when all the columns are fed, contact point No. 2 is masked by contact point No. 1. The solution for this problem is in performing a sequential scanning of the sensor.

The columns are fed, e.g., at 5V in turn and the level of the lines (high or low level) measured sequentially.

When one of the columns is placed under voltage, the others are in high impedance to prevent the propagation of current into the latter.

Thus, column 1 is fed at first while the other columns are in high impedance.

The lines are measured sequentially, that is, one after the other. The value on the first line is read initially while all the other lines are connected to ground. Then, line 1 is connected to ground and the value on line 2 is read and so forth until the value of all the lines has been read.

Column 1 then passes into the high impedance state and column 2 is fed. The reading of the state of each of the lines recommences.

The scanning is performed in this manner up to the last column.

As the goal is to form a multi-contact tile, the total scanning of the matrix is carried out at an elevated frequency to obtain the value of each of the intersection points of the tile several times per second.

Figure 2D:
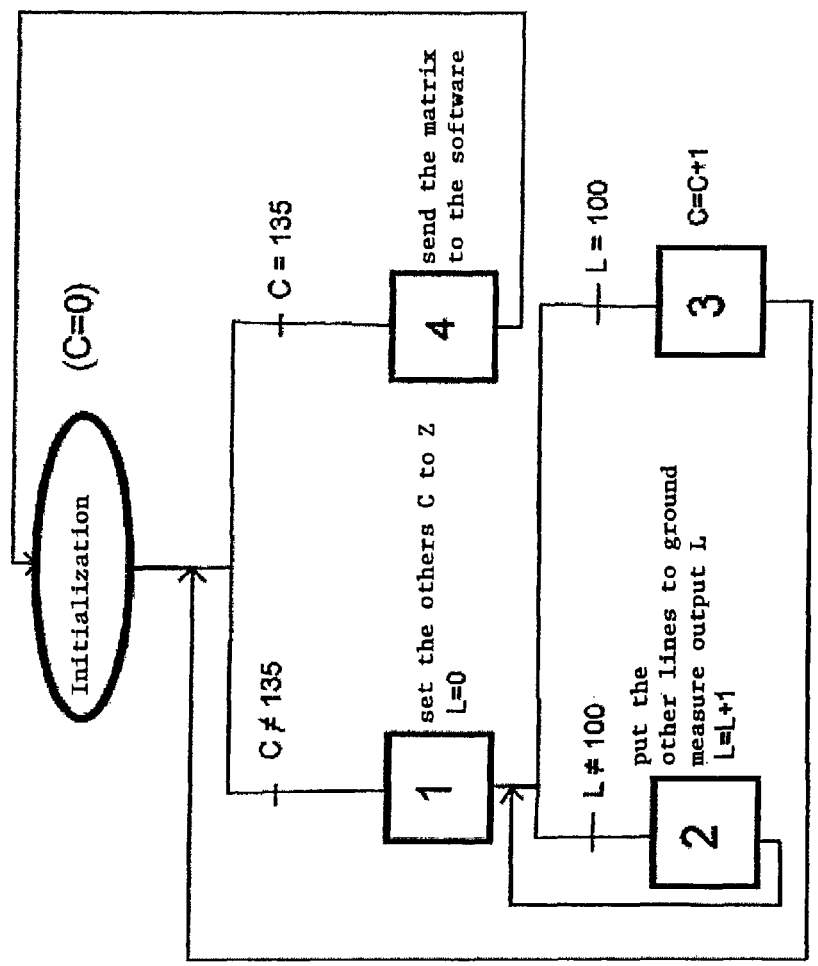
FIG. 2D is a functional diagram of the capture interface.

The device permitting the acquisition of the tile data is illustrated in FIG. 2D, representing the algorithm of the acquisition of a tile comprising 100 lines (L) and 135 columns (C).

Certain problems in the masking of a point by one or several other points can appear.

In fact, the resistance of the transparent material (ITO) composing the columns and the lines increases proportionately to the length of the tracks. Thus, the potential measured at the lower left corner of the sensor will be greater than the potential measured at the upper right corner.

Figure 2E:
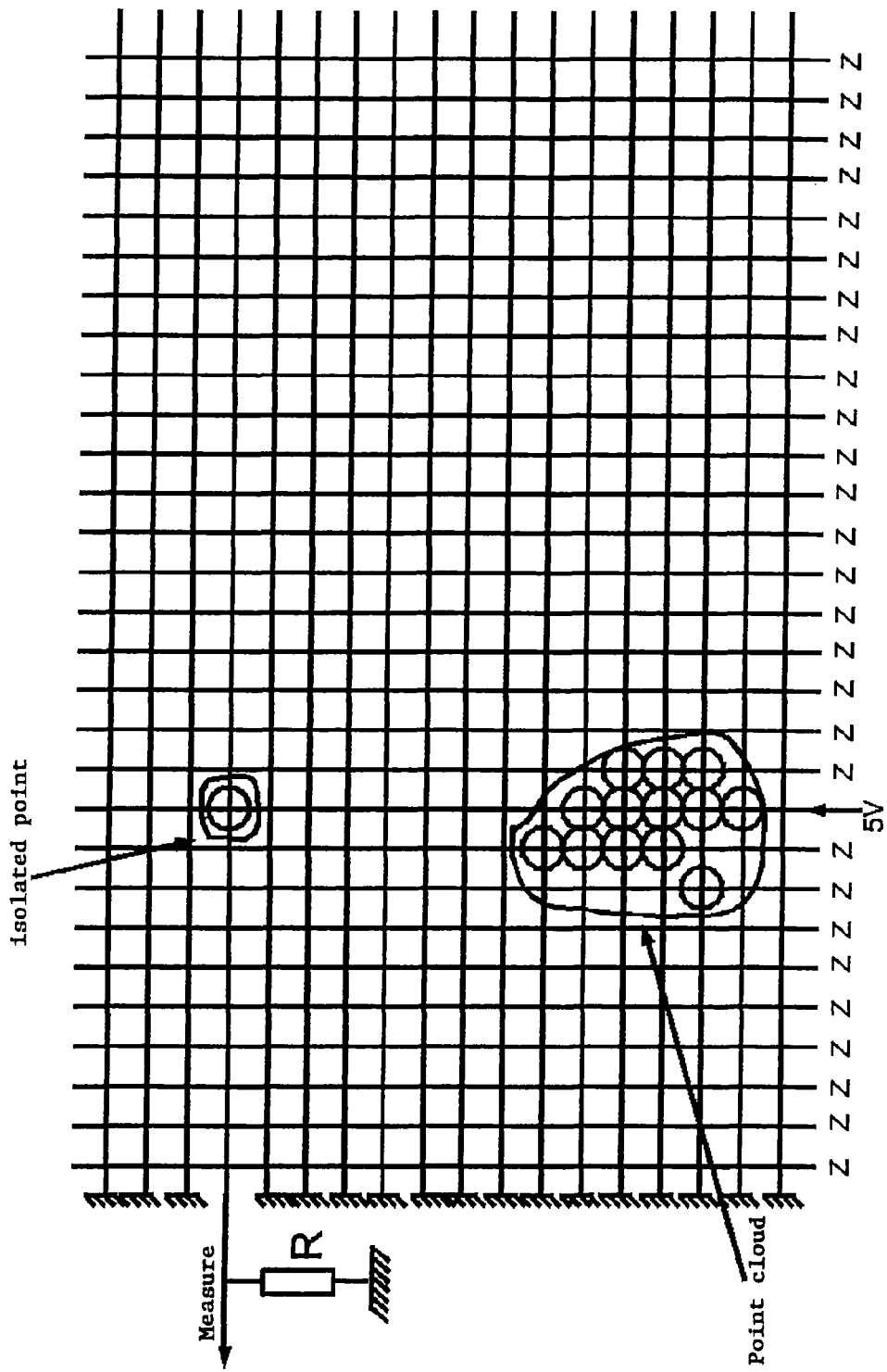
Figure 2F:
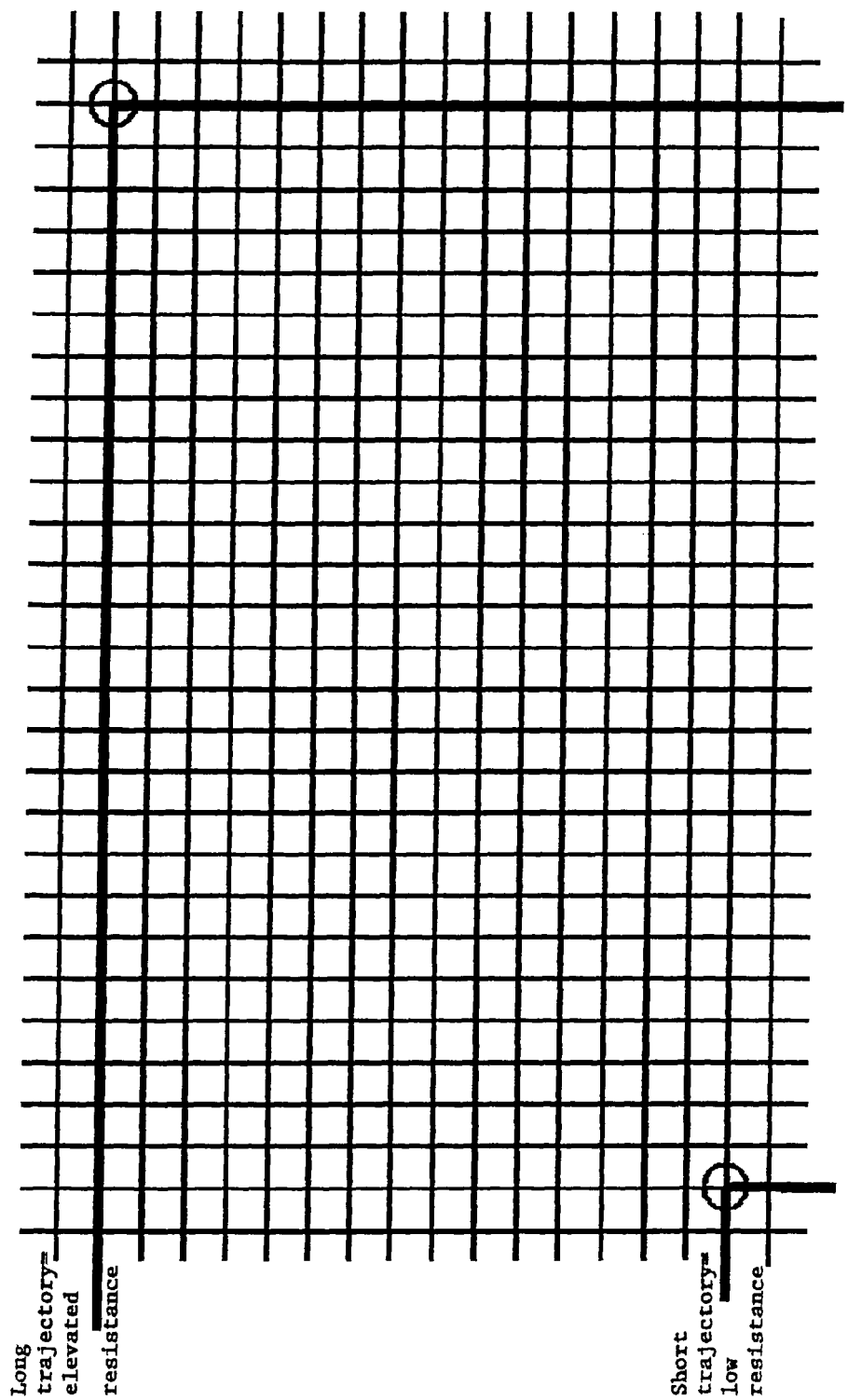

In FIGS. 2E and 2F, the cloud of points absorbs a large part of the electrical potential of the fed column. The potential measured at the isolated point is therefore too low to be detected.

A solution to this problem is in using a voltage comparator piloted digitally at the output of the line to determine whether the tension observed is sufficient for being considered as resulting from the action of a finger on the tactile tile. The reference value of the comparator (comparison threshold) is decremented at each line measure. Thus, the comparison values of the last lines are lower than those of the first lines, which allows the contact point located at the lower left or the upper right to be detected in the same manner.

Thus, e.g., a complete sampling of the tile is performed at least 100 times per second for the columns and the lines.

Figure 1C:
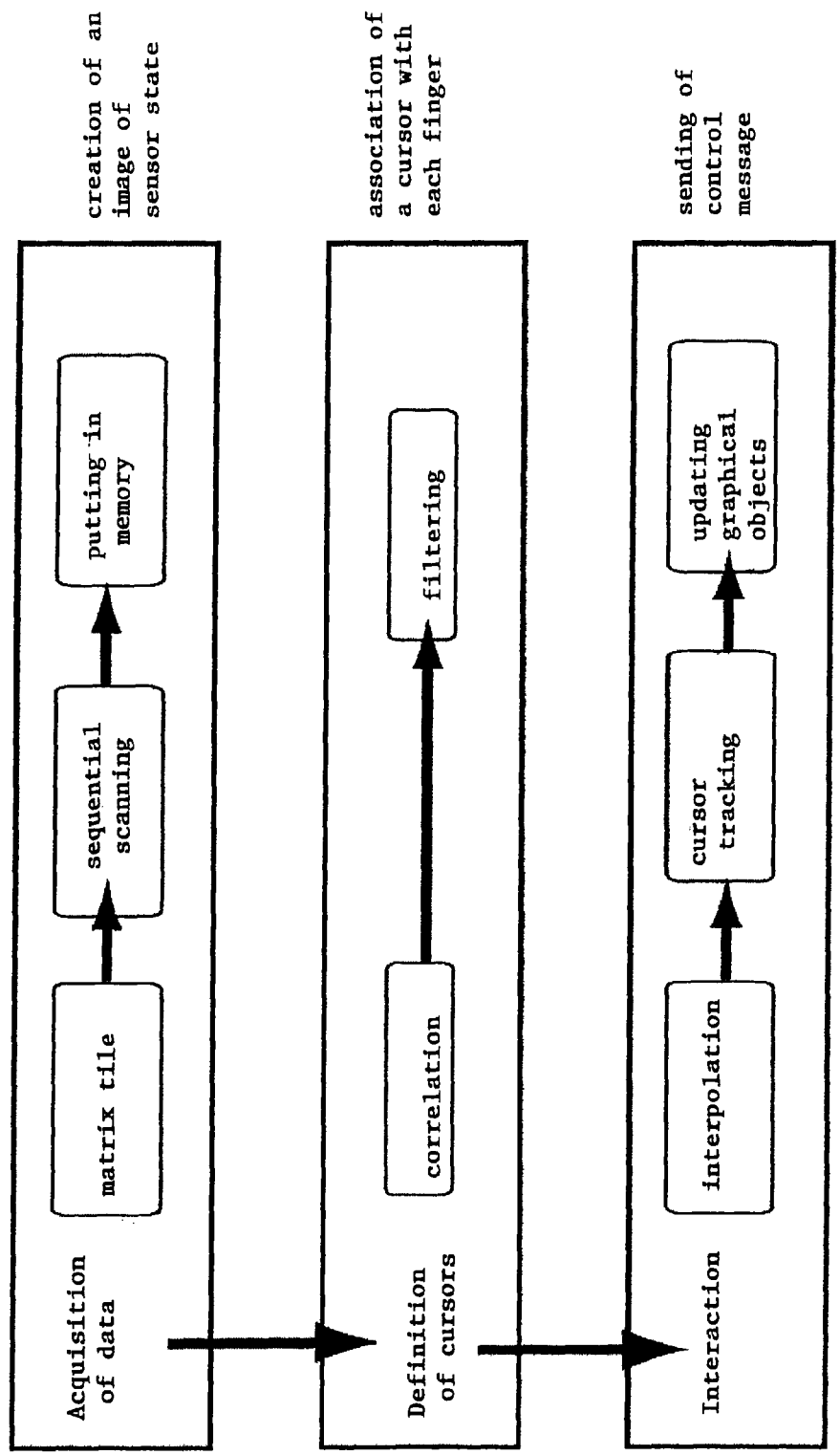
FIG. 1C represents the functional diagram of the different stages of the processes for the acquisition of data coming from the sensor, of the creation of cursors associated with the different fingers, of the interaction with the graphical objects and of the generation of control messages.

The data from capture interface 102 thus form an image representative of the totality of the sensor. This image is placed in memory so that a program can proceed to the filtering, the detection of the fingers and to the creation of the cursors as seen in FIG. 1.

Figure 3A:
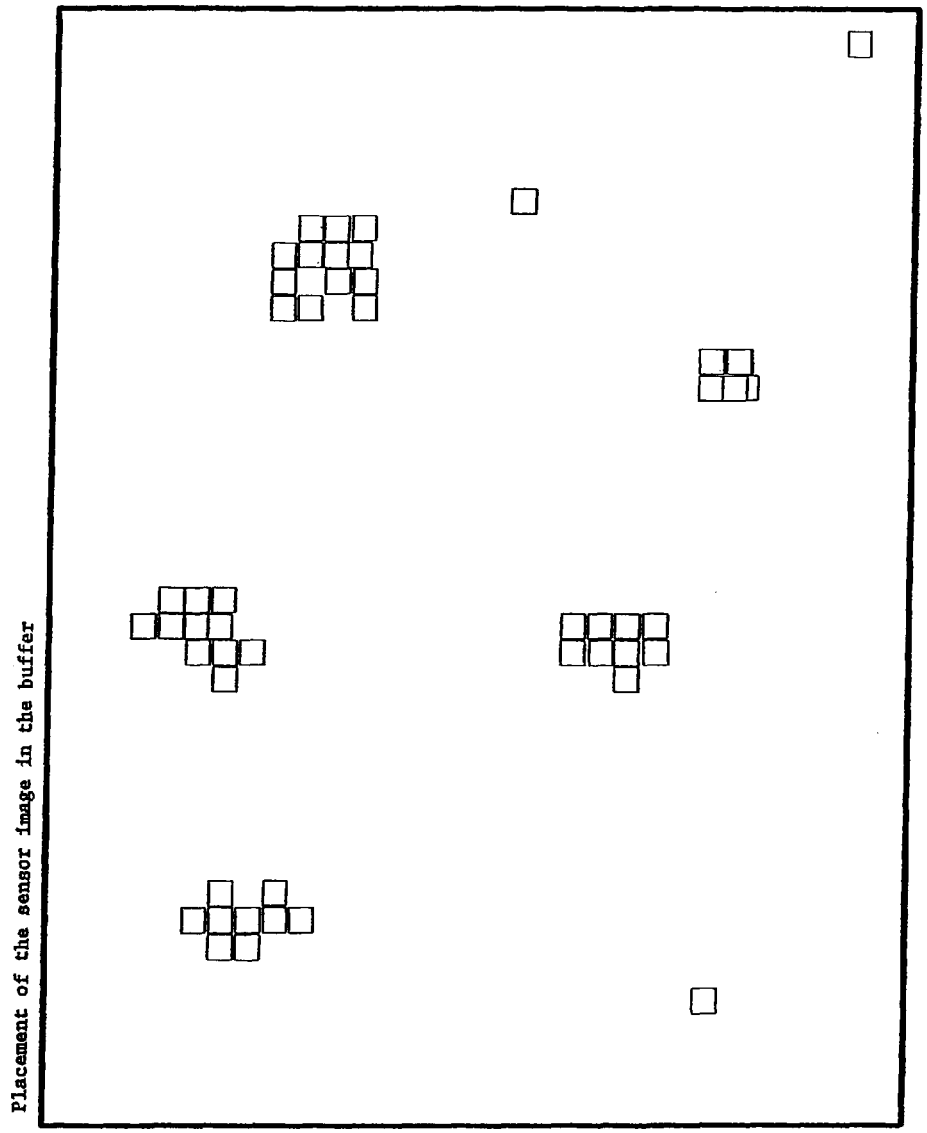
FIGS. 3A to 3D are diagrams explaining the stages for the creation of cursors, filtering, calculation of barycenter, mapping and of the control of graphical objects.
Figure 3B:
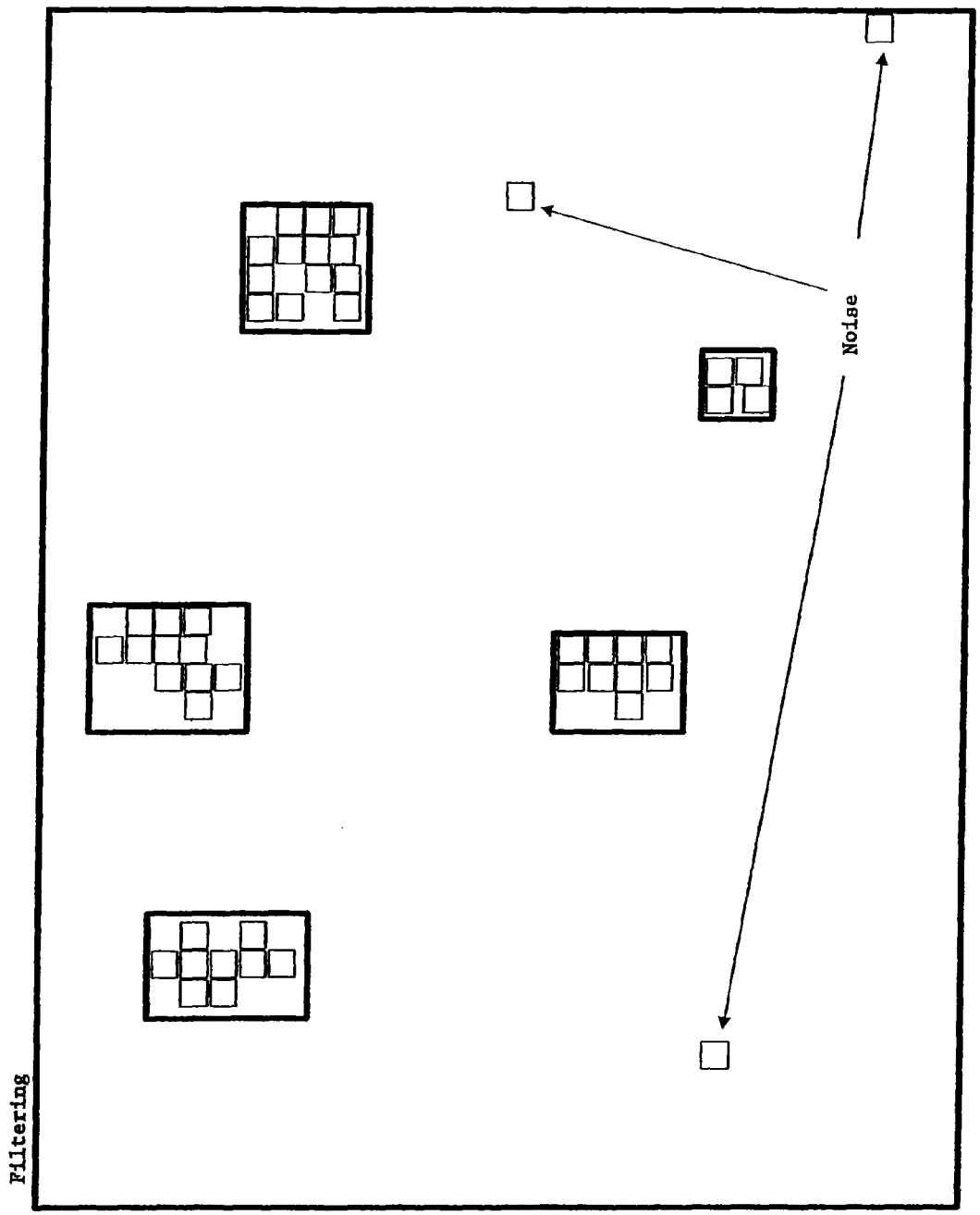

The filtering phase illustrated by FIG. 3B eliminates noise that might be generated by the acquisition interface or the sensor itself. It is considered that only the clouds of several contact points can correspond to the pressure of a finger. Therefore, a bounding zone detection is carried out to eliminate isolated contact points.

Figure 3C:
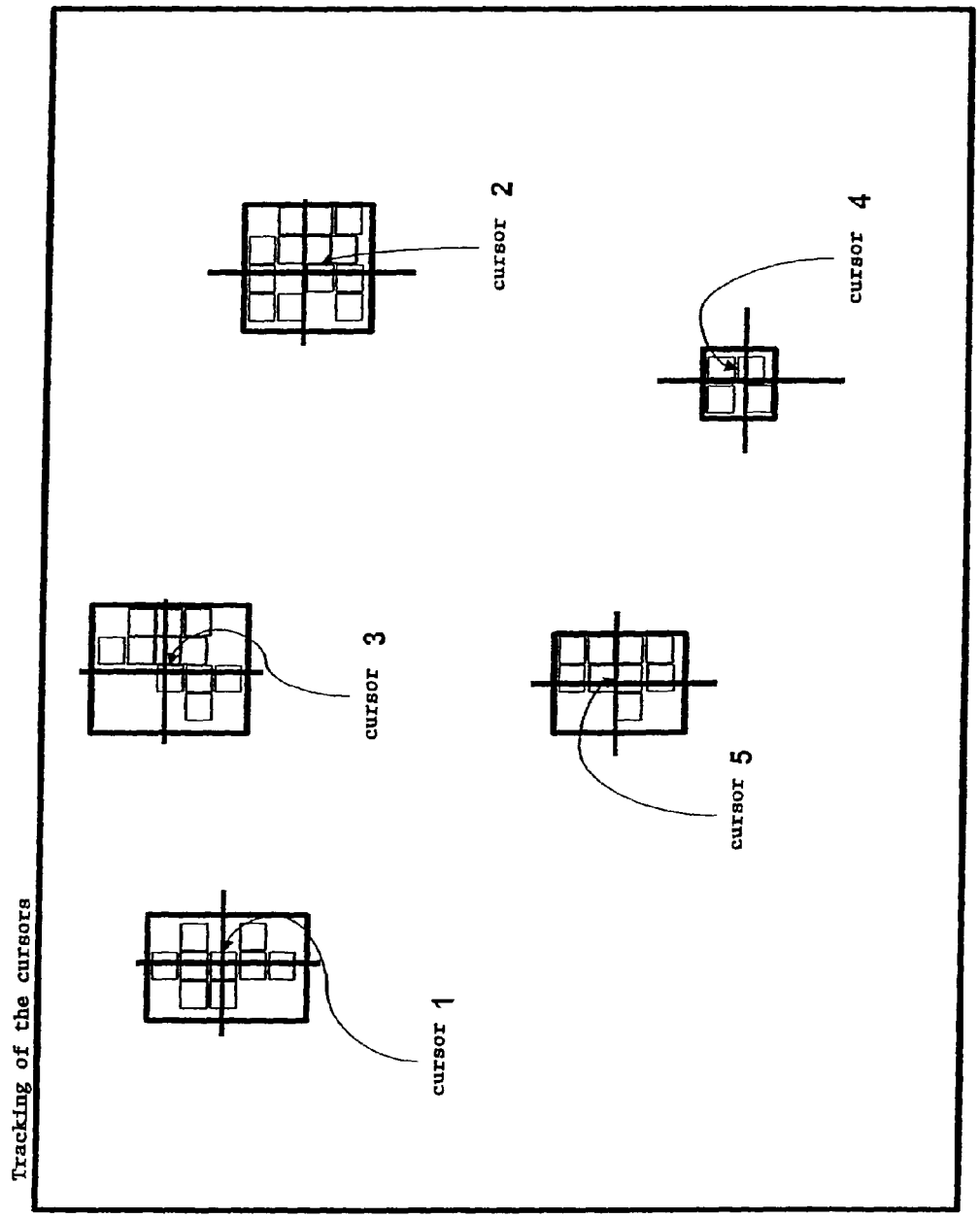
Figure 3D:
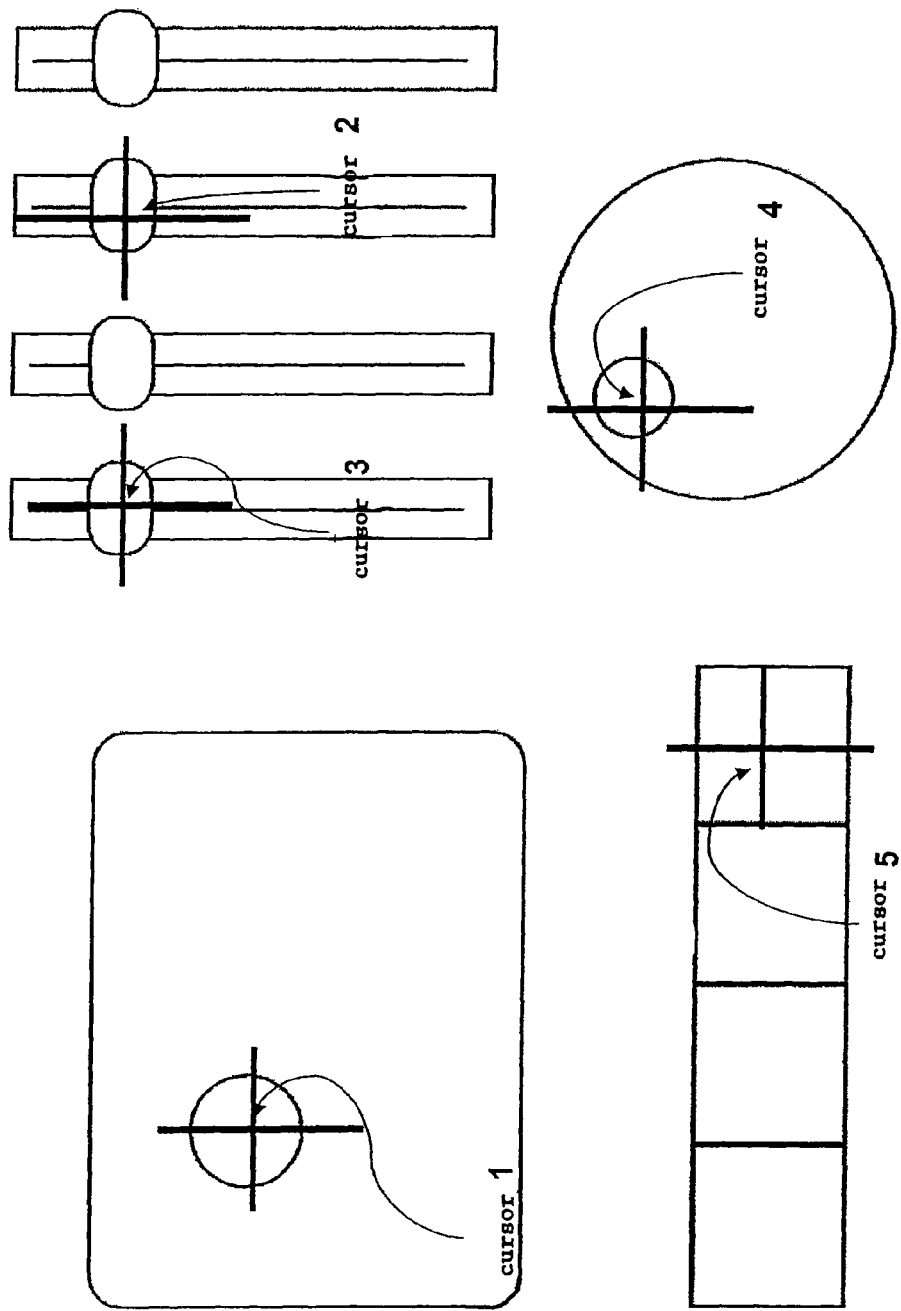

The following stage associates a cursor with each support point (FIG. 3C). To this end, the barycenter of each bounding zone is calculated. When a finger is released, the corresponding cursor is freed.

The program executed locally by the main processor allows these cursors to be associated with graphical objects that are displayed on screen 105 to manipulate them. At the same time, the local program uses these cursors for generating control messages addressed to the host computer or the controlled apparatus.

Furthermore, the program comprises a simulator of the physical models allowing modification of the interaction laws between the cursors and the graphical objects. Different physical models can be employed: spring-loaded system, vibration of a string, management of collisions, the law of gravity, electromagnetic field and the like.

The program considers the positioning of the cursors and on which graphical object each is located. A specific processing is supplied to the data coming from the sensor as a function of the object considered. For example, a pressure measurement (corresponding to a development of the spot made by the finger on the tactile tile in a short interval of time) can be interpreted. Other parameters can be deduced as a function of the nature of the object: the acceleration, speed, trajectories, etc. Algorithms of recognition of form can also be applied to differentiate different fingers.

The main program 103 also transmits the data to be displayed on screen 105 to graphical interface 104. Moreover, this graphical interface is constituted of a graphical processor. This graphical processor is, e.g., of a known type. The latter can be constituted of primitive graphical functions allowing, e.g., the displaying of bitmap, fonts of polygons and figures in 2 and 3 dimensions, vectorial design, antialiasing, texture mapping, transparency and interpolation of colors.

The main program may also comprise an analyzer of mathematical expressions that allows mathematical functions to be inputted and calculated in real time. These functions allow the values of any variable to be modified. For example, the coordinates (x, y) of a cursor inside an object can be considered as two variables comprised between 0 and 1. The expression analyzer allows an expression of the type "x* 1000+600" to be created to obtain a new variable whose value is comprised between 600 and 1600. The variable obtained allows the control, e.g., of the frequency of an oscillator comprised between 600 and 1600 hertz.

The mathematical expressions can be applied to scalar values as well as to vectors.

The expression analyzer is a tool that allows real-time calculations to be performed on the variables of objects.

Local program 103 also performs a formatting of data in the form of messages for network port 106, that communicates it to the computer on which the computer applications are performed.

The network interface is, e.g., an Ethernet 10/100 baseT standard interface that communicates by packets with the protocol TCP/IP. It can also be a network interface of the wireless type.

Figure 11:
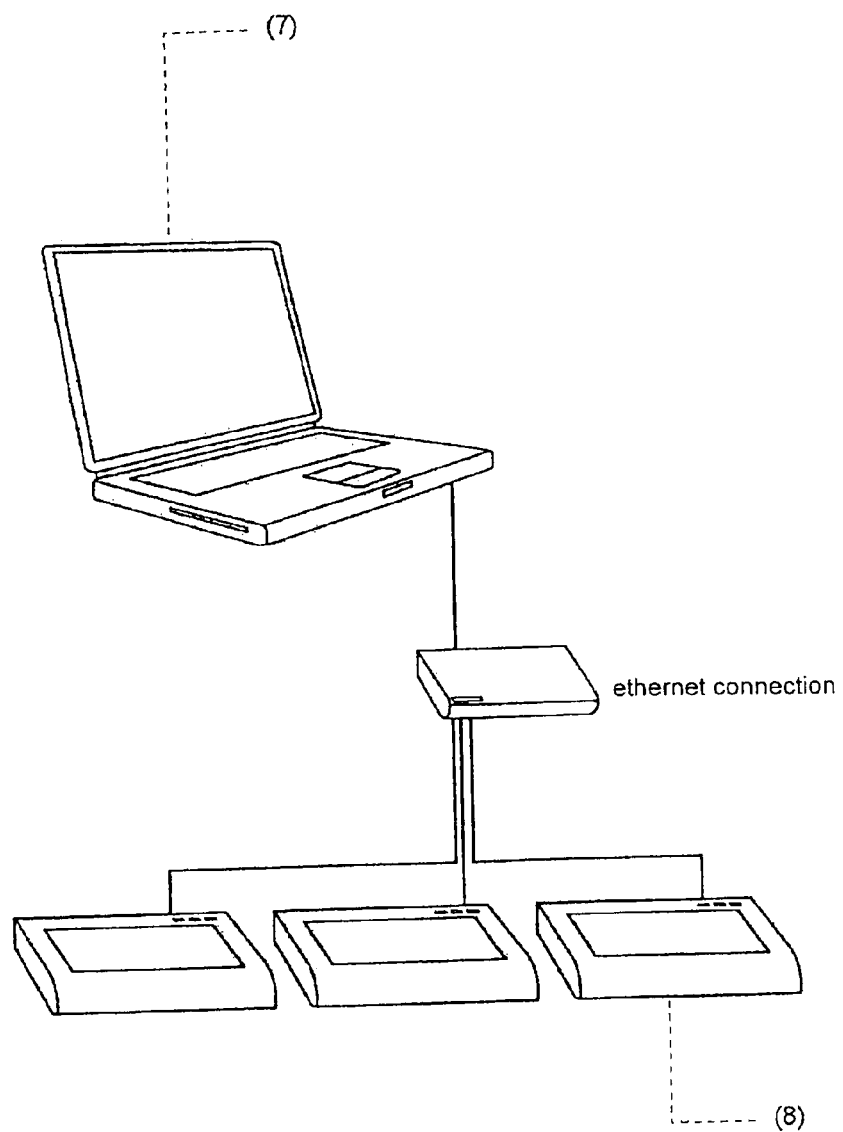
FIG. 11 illustrates the network use of the controller associated with the computer of the user.

It should be noted as illustrated in FIG. 11 that the Ethernet connection offers the user the possibility, by using a simple hub (multi-socket network), of indefinitely expanding the control apparatus by constituting a network of controllers.

The controller or controllers present in the network then communicate among themselves and with the host computer in the form of the reciprocal sending of messages.

Furthermore, the unit constituting the machine is fed by a battery (not shown) of a known type or by an AC adapter.

Finally, an interface editor 107 at the level of the computer of the user allows the interface, that is, the totality of the graphic objects displayed on screen 105, to be programmed in a graphical manner. The interfaces may themselves be organized in scenes, that are higher hierarchical structures. In fact, each scene comprises several interfaces. The user can interchange the interfaces with the aid of a button keyboard or a control pedal board connected to input-output port 109.

Another function of the interface editor is to assign the control data to the parameters that the user wishes to control.

Figure 4:
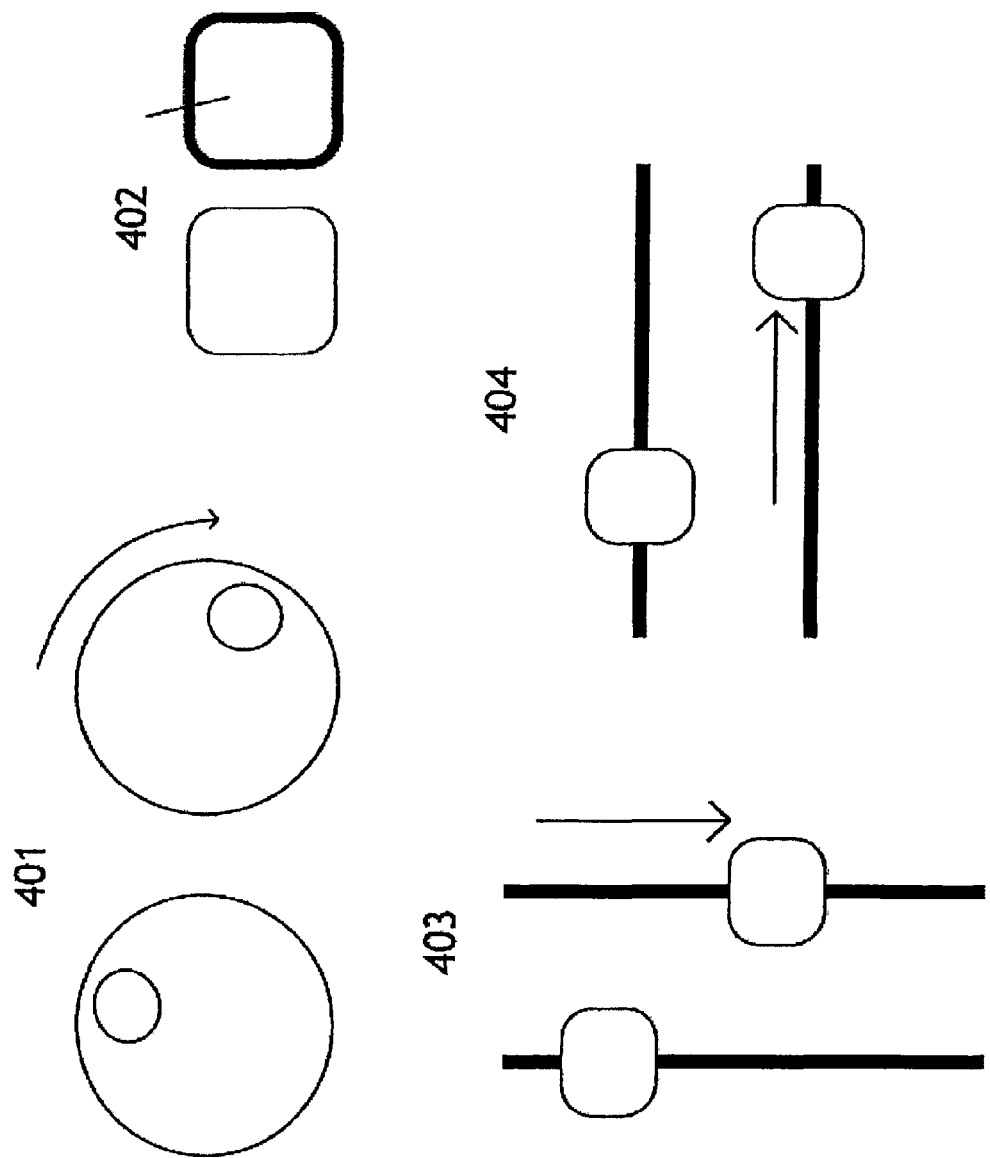
FIGS. 4 and 5 represent different examples of graphical objects.
Figure 5:
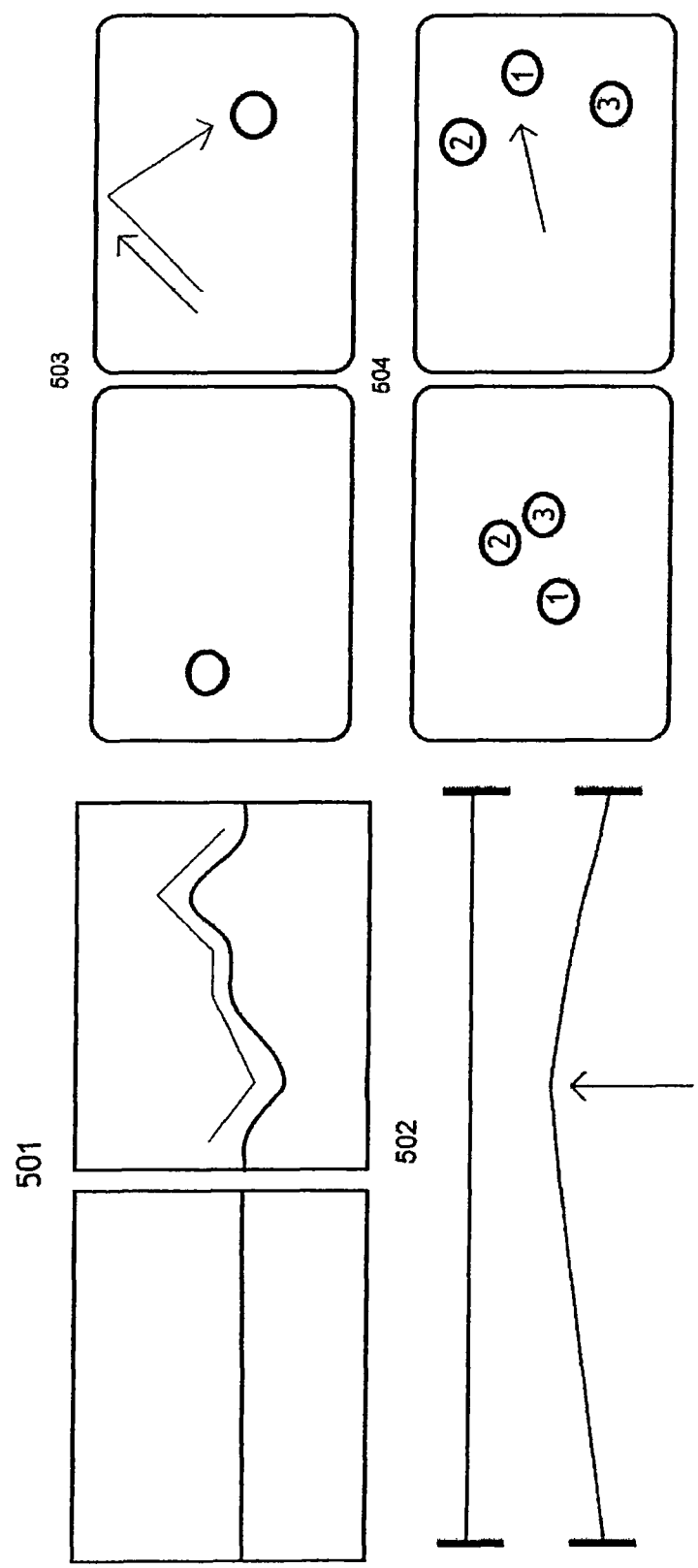

The user has at the user's disposal, e.g., a library of parameterable graphical objects allowing the composition of different interfaces according to the application desired. FIGS. 4 and 5 represent different graphical objects placed at the disposition of the user.

They can be predefined and dedicated quite particularly to music or to the control of audiovisual equipment or computerized apparatuses. For example, a linear potentiometer 403, 404 is particularly adapted to control continuous parameters such as the volume of a sound signal, the frequency of a filter. A serrated wheel 401 can serve, e.g., to control the playing of an audio or video reader. The objects can also be freely developed with a development kit (SDK) of a known type 109. The development kit furnishes access to the primitive graphical functions of the controller.

Interface editor 107 thus allows the user to readily create personalized control interfaces. It is a software executed on the user's computer. It is composed of a main window representing the tactile surface of the tile on which graphical objects from a library of proposed objects can be placed. The manipulation and placing of objects on the surface are performed, e.g., with the mouse. The object placed on the window is displayed at the same time on the controller and the object is recorded in a memory of the controller. It can subsequently move or re-dimension the objects at its convenience.

In addition to the positioning of graphical objects on the main window, other secondary windows allow the regulation of different parameters inherent in the objects (graphical properties, physical behavior). For example, a button 402 can also act as a switch or as a trigger. In the case of the trigger mode, a pressure measurement can optionally be performed. Another example of a parameterable object is area 2D (503, 544) of which the principle includes moving pawns inside a delimited zone. The number of pawns present in area 2D is a parameterable option. The area can be configured in uniplan mode, a mode in which the pawns enter into collision with each other, or multi-plan, a mode in which the pawns are placed on distinct superposed planes. Physical parameters can also be configured: the coefficient of friction of the pawns on the plane, the rebound and the attraction of the pawns on the edges and among themselves.

The editor also permits the objects present on the surface to be listed and the creation of functions and of variables with the expression analyzer.

Thus, the objects have by default a certain number of variables (x, y, z . . . ) corresponding to their primitive axes. These variables are always comprised between 0 and 1 and vary in the form of 32-bit numbers with floating comma. The user must be able to "connect" these variables to other values more representative of what he desires to control. Thus, the expression analyzer furnishes the possibility of creating new variables with the aid of simple mathematical expressions. For example, a rectilinear potentiometer has a primitive axis that is x. If the user wishes to control the frequency of 500 to 2500 Hz he must create a variable a=2000x+500.

Status display options are also desired. They permit a visual control of the state of a parameter.

The further treatments to be applied to the objects at the level of the main calculating unit 103 by the manipulation on the tile are specific to each type of object.

In fact, a circular movement of the finger on a virtual linear potentiometer (403, 404) should not have an effect on the state of the potentiometer whereas it should modify the state in the case of a circular potentiometer 401. Likewise, certain objects can only take into account a single finger (the linear potentiometer, for example) at a time whereas others can accept the interaction of several fingers (keyboard, area 2D).

For example, the "area 2D" (503, 504) is a rectangular surface containing a certain number of pawns, each with its own position. The pawns can be moved by the user.

The principle is to put in place a physical system for the totality of the objects, that is, e.g., that the pawns moved by the user acquire a speed of inertia that they retain when the user lets them go; the pawns subjected in this manner to their own speed will rebound on the edges of "area 2D" and also rebound among themselves. Furthermore, they will be subjected to forces of attraction/repulsion on the edges and on the other pawns as well as to a coefficient of friction on the surface of area 2D for stopping the pawns at the end of a certain time. All these parameters will be parameterable.

Another variant of area 2D includes applying a physical law of the "spring-loaded" type. A virtual rubber band is stretched between each cursor and each pawn. The user can modify the behavior of this object by configuring the friction and the interpolation factor. These properties can also be modified in real time with the aid of other objects.

Another example is the "Multislider" 501, a table of cursors whose numbers can be configured. The typical use is the controlling of a graphic equalizer or of a spectral envelope. The difference between a "multislider" and several simple juxtaposed linear potentiometers is that the totality of the cursors can be modified in a single touch by sliding the finger. The multislider can also be used as a discrete string. For this, it is sufficient to apply to it the physical model of a string whose tension is parameterable by the user.

A visualization of different examples of interfaces uniting different types of objects is illustrated by FIGS. 6 to 9, in which several objects described above can be observed.

Figure 6:
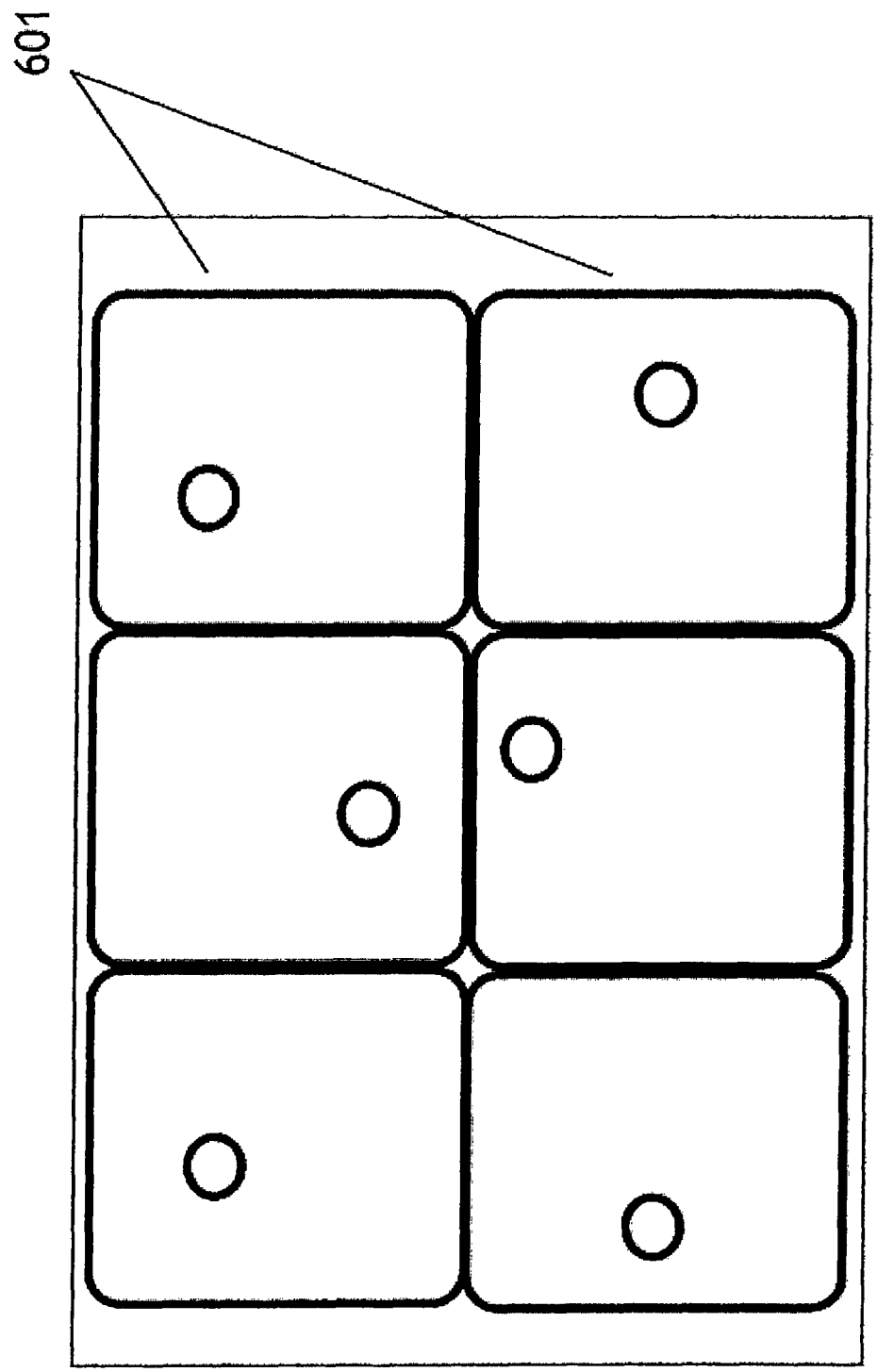
FIGS. 6 to 10 represent different examples of combinations of graphical objects on the controller.

FIG. 6 shows an arrangement of 6 areas 2D (601) containing 1 pawn each. This interface could control, e.g., six different filters assigned to one or several sound sources. In this instance, the abscissa movement of each pawn in each zone controls the frequency of the filter whereas the ordinate movement controls the quality factor or the width of the filter band.

Figure 7:
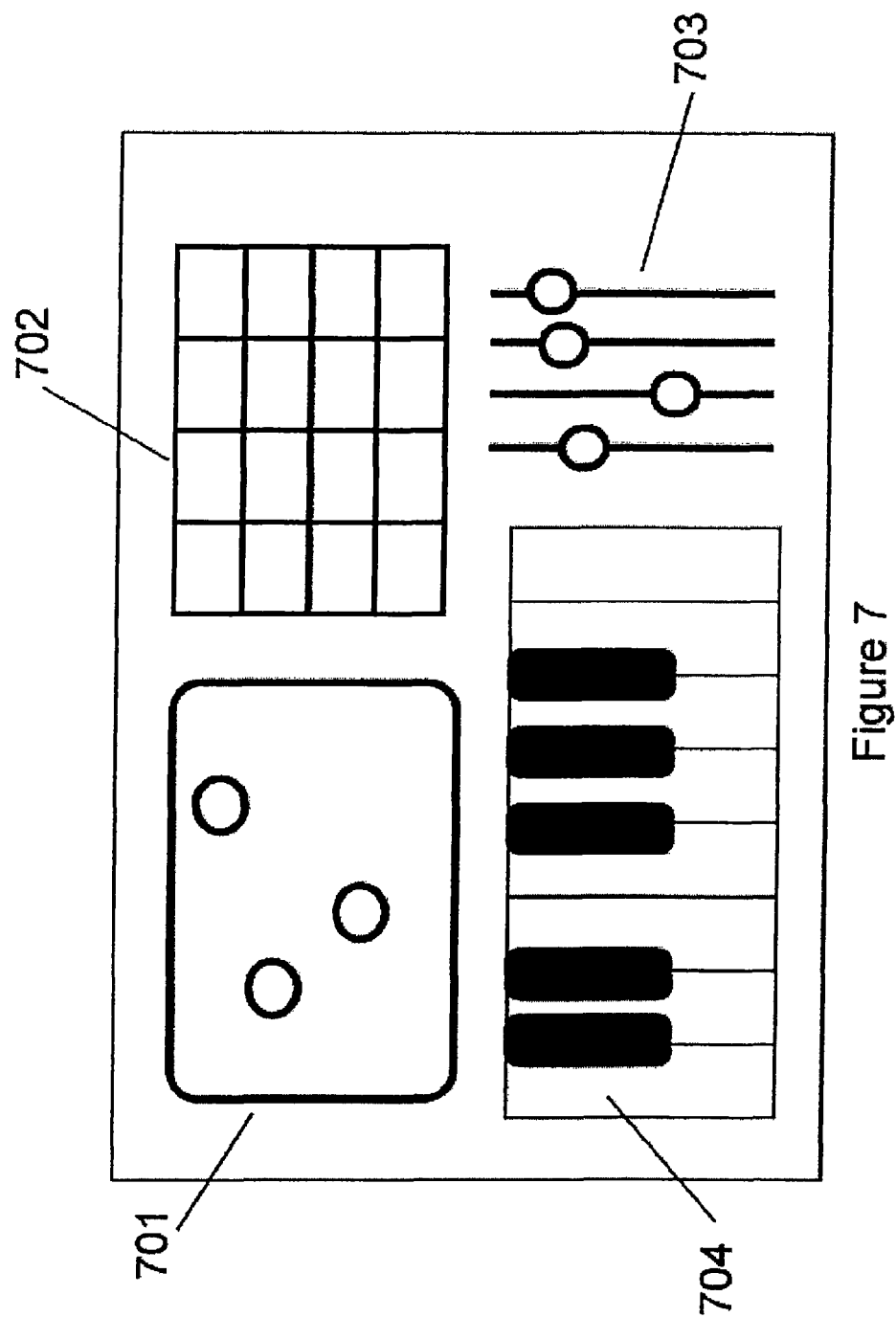

FIG. 7 shows an example of the control of a synthesizer or of a sampler of a known type. The interface is composed by a tempered keyboard 704 controlling the pitch of the sounds, by a group of four vertical potentiometers 703 allowing the control, e.g., of its dynamic envelope (attack time, hold level, release time). An area 2D (701) containing 3 pawns allows the control, e.g., of effects applied to the sound (reverberation, echo, filters). A matrix of 16 buttons 792 can, e.g., release 16 different recorded musical sequences or also call up 16 pre-recorded configurations of the previously described controls.

Figure 8:
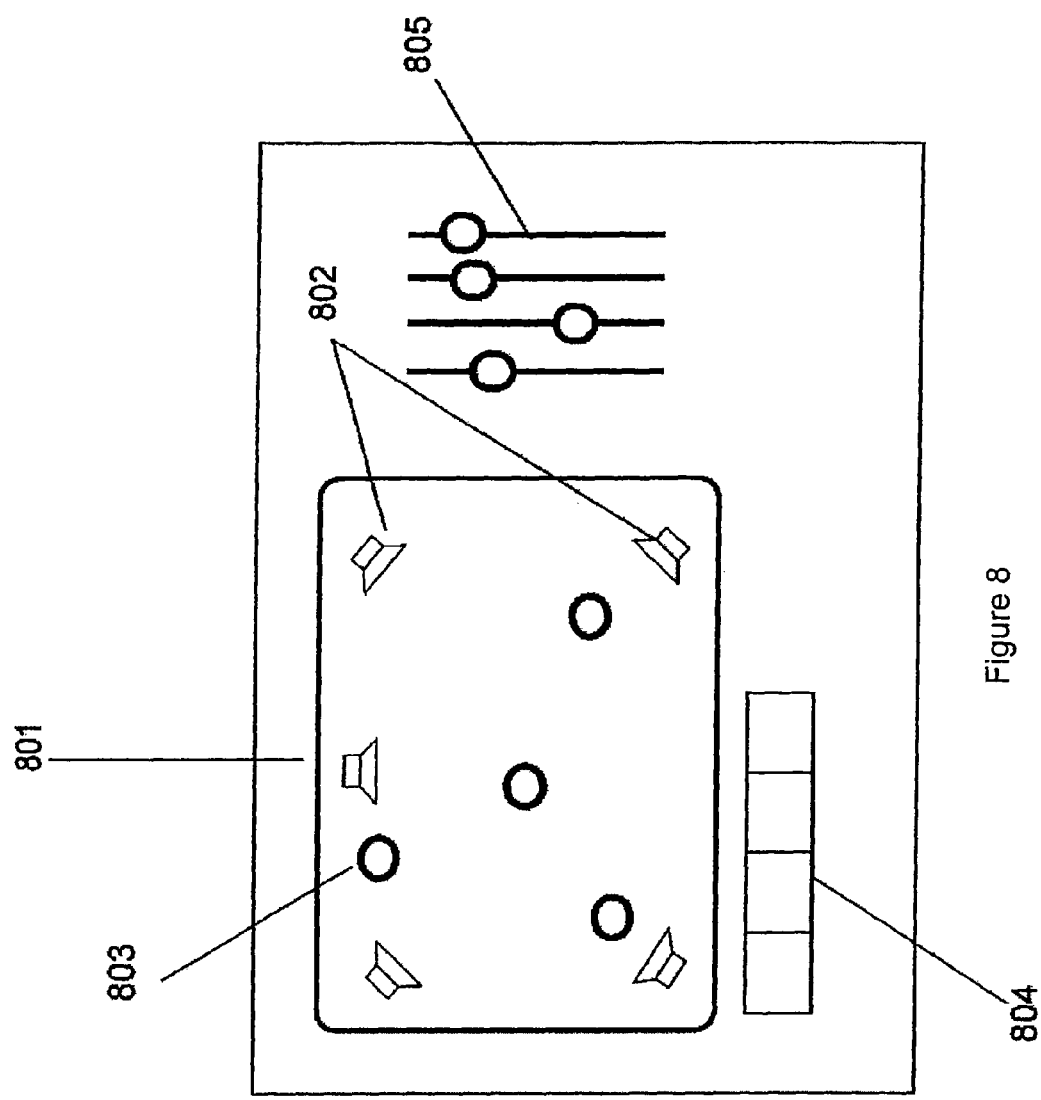

Another example is illustrated by FIG. 8 showing the control of a device for the broadcasting of different sound sources into space on a device constituted by several loudspeakers. In this configuration an area 2D (801) representing the broadcasting space contains 4 pawns 801 corresponding to four sound sources. Area 2D also contains 5 icons 802 representing the position of five loudspeakers. The level and/or the phase of each sound source relative to each enclosed space is regulated by moving the different pawns 802, which determines its emplacement in the space. Moreover, a group of four linear potentiometers 803 allows the relative level of each source to be regulated. A unit of four buttons 804 allows each sound source to be activated or deactivated.

Figure 9:
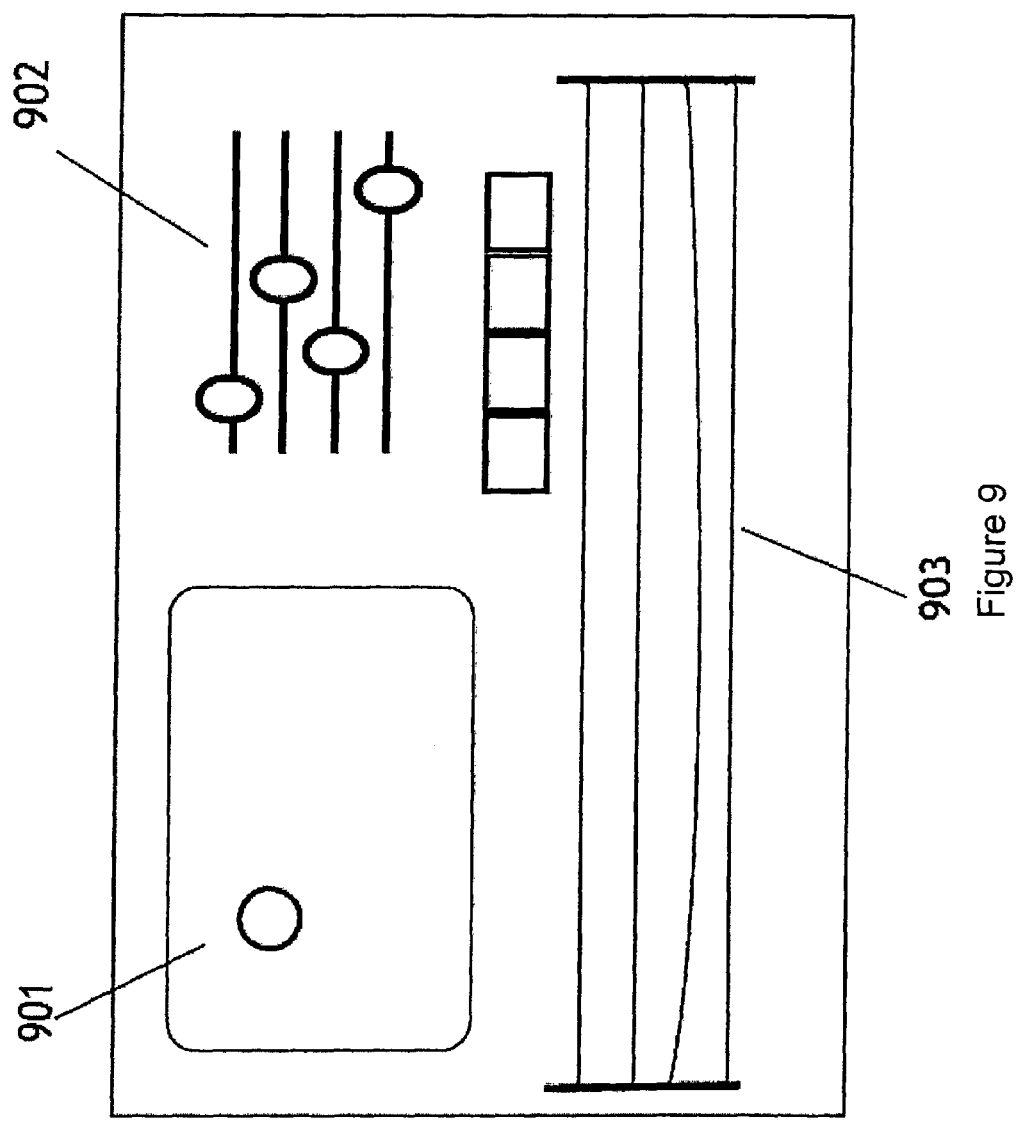

Another example is illustrated in FIG. 9 that shows the control of a synthesizer or a sound generator according to a configuration different from that shown in FIG. 7. Here, the frequency of the sound generator is controlled by four virtual strings 903. The initial tension (the pitch) of each string can itself be controlled, e.g., by a linear potentiometer 902. An area 2D 10, e.g., control other parameters of the sound generator such as the output level, the sound quality, the panning, etc.

Figure 10:
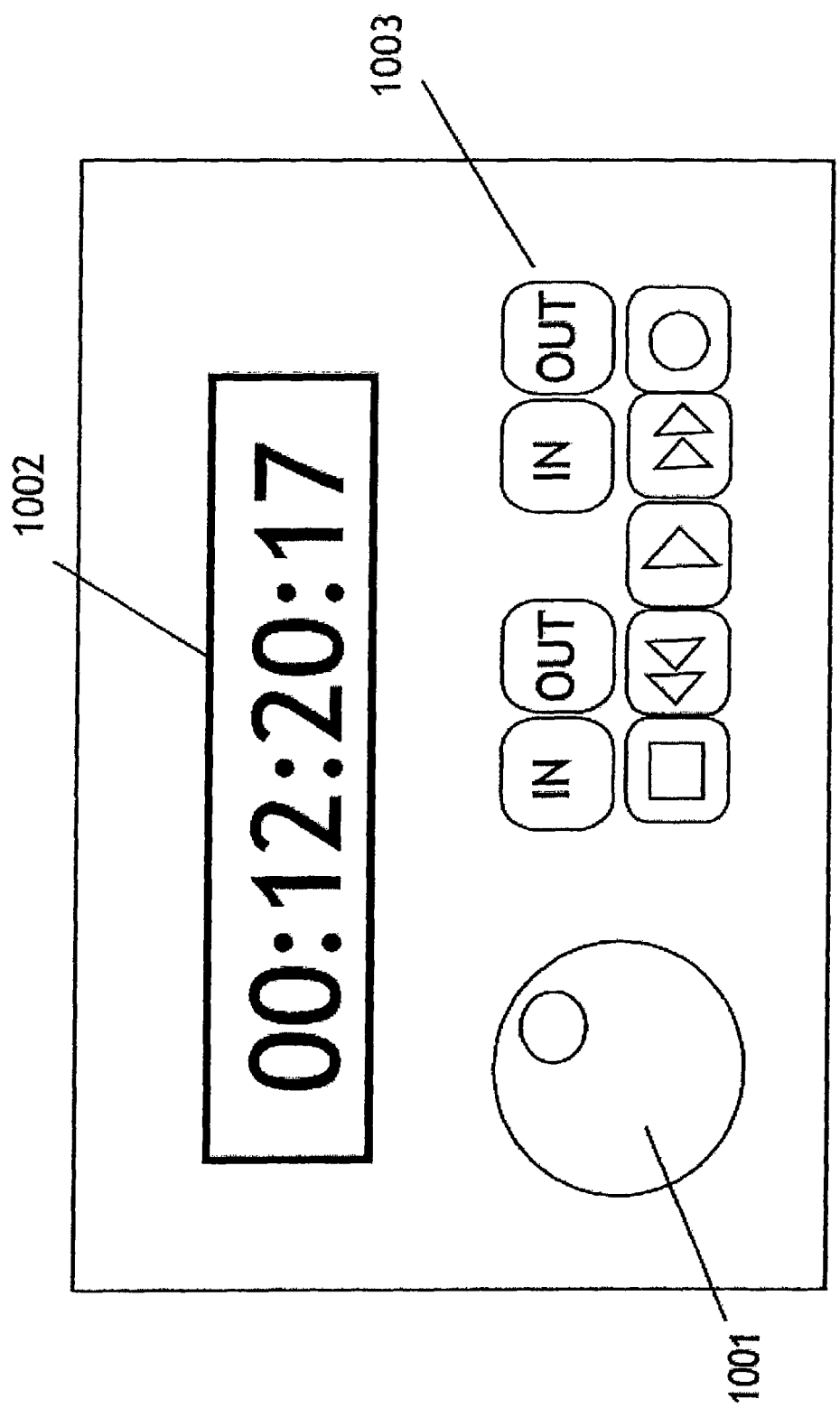

FIG. 10 shows the control of equipment for audio and/or video editing of a known type. A serrated wheel 1001 allows the rate of reading the audio and/or video sources to be controlled. Status display object 1002 allows the positioning of the reading to be represented according to a format (hour, minute, second, image) of a known type. A set of buttons 1003 allows access to the functions of reading and editing of the controlled apparatus.

The devices and methods described above are by way of example. It is understood that one skilled in the art is capable of realizing different variants of the devices and methods without departing from the scope of the appended claims.

The invention claimed is:

1. A method of controlling a computerized device with a tactile multi-point matrix sensor placed on a display device, comprising:
    displaying at least a first and a second graphical object on the display device;
    simultaneously acquiring data of a first contact position of a first finger on the multi-point tactile matrix sensor that overlays the display device, the first contact position corresponding to a position of the first graphical object and a second contact position of a second finger on the multi-point tactile matrix sensor that overlays the display device, the second contact position corresponding to a position of the second graphical object;
    creating a first cursor and a second cursor that are associated with the first and second finger, respectively;
    associating the first cursor with the first graphical object and the second cursor with the second graphical object, the first and second cursors interacting with the first and second graphical objects, respectively; and
    generating control messages for the computerized device based on positional data of the first cursor, the second cursor, the first graphical object and the second graphical object.

2. The method according to claim 1, wherein said step of associating further comprises:
    following the first contact position and the second contact position with an evolution of time; and
    updating at least one of a position or shape of the first or the second graphical object based on said step of following.

3. The method according to claim 1, further comprising:
    calculating in real time, based on a mathematical function having a parameter, new coordinate values for a cursor that is associated the first or the second graphical object, a value of the parameter controlling the computerized device.

4. The method according to claim 1, wherein the first or the second graphical object represents a linear potentiometer that is configured to control a continuous parameter value for the computerized device.

5. The method according to claim 1, wherein the first or the second graphical object represents a rotary button that is configured to control a playback position of at least one of an audio or video signal that is played by the computerized device.

6. The method according to claim 1, wherein the first and the second graphical objects represent a keyboard as an input unit for the computerized device by the use of the first and second finger.

7. The method according to claim 1, wherein the first and the second graphical objects are a multi-slider that is configured to control a frequency spectrum of audio that is processed by the computerized device.

8. The method according to claim 1, wherein the first or the second graphical object is a dot located inside a displayed rectangular box, and a vertical movement of the dot within the rectangular box modifies a filter frequency for an audio filter that is implemented by the computerized device, and a horizontal movement of the dot within the rectangular box modifies the bandwidth of the audio filter.

9. The method according to claim 1, wherein the first and second objects are different.

10. A computerized device comprising:
    a display device configured to display at least a first graphical object and a second graphical object;
    a tactile multi-point matrix sensor that is placed on the display device, configured to simultaneously acquire data of a first contact position of a first finger at a location corresponding to an image of the first graphical object and a second contact position of a second finger at a location of an image of the second graphical object; and
    a processor configured to
        create a first cursor and a second cursor that are associated with the first and second finger, respectively,
        associate the first cursor with the first graphical object and the second cursor with the second graphical object, the first and second cursors interacting with the first and second graphical objects, respectively, and
        generate control messages for the computerized device based on positional data of the first cursor, the second cursor, the first graphical object and the second graphical object.

11. The computerized device according to claim 10, wherein
    the first and second graphical objects represent a graphical audio control interface for the computerized device, and include:
    a music keyboard for playing sounds at different frequencies.

12. The computerized device according to claim 10, wherein the first and second graphical objects represent a graphical audio control interface for the computerized device, and include:
a linear potentiometer for controlling a dynamic envelope of the audio.

13. The computerized device according to claim 10, wherein
the first and second graphical objects represent a graphical audio control interface for the computerized device, and include:
a rectangular area including a dot that can be moved within the rectangular area to control sound effects.

14. The computerized device according to claim 10, wherein
the first and second graphical objects represent a graphical audio control interface for the computerized device, and include:
a matrix of buttons that can be associated with different sequences of sound effects.

15. The computerized device according to claim 10, wherein
the first and second graphical objects represent a graphical audio control interface for the computerized device, and include:
a horizontally expanding line representing amplitudes of different audio frequencies that can be moved at multiple positions in vertical direction to modify the frequency curve of the audio.

16. A non-transitory computer-readable medium storing computer-readable instructions thereon, the computer-readable instructions when executed by a computer cause the computer to perform a method comprising:
displaying at least a first and a second graphical object on a display device;
simultaneously acquiring data of a first contact position of a first finger on a multi-point tactile matrix sensor that overlays the display device, the first contact position corresponding to a position of the first graphical object and a second contact position of a second finger on the multi-point tactile matrix sensor that overlays the display device, the second contact position corresponding to a position of the second graphical object;
creating a first cursor and a second cursor that are associated with the first and second finger, respectively;
associating the first cursor with the first graphical object and the second cursor with the second graphical object, the first and second cursors interacting with the first and second graphical objects, respectively; and
generating control messages for the computerized device based on positional data of the first cursor, the second cursor, the first graphical object and the second graphical object.

* * * * *